Sept. 13, 1949.
G. G. GRUETTNER
2,481,657
ELECTRICALLY OPERATED ENGRAVING AND
COPYING MACHINE
Filed Jan. 25, 1946
3 Sheets-Sheet 1
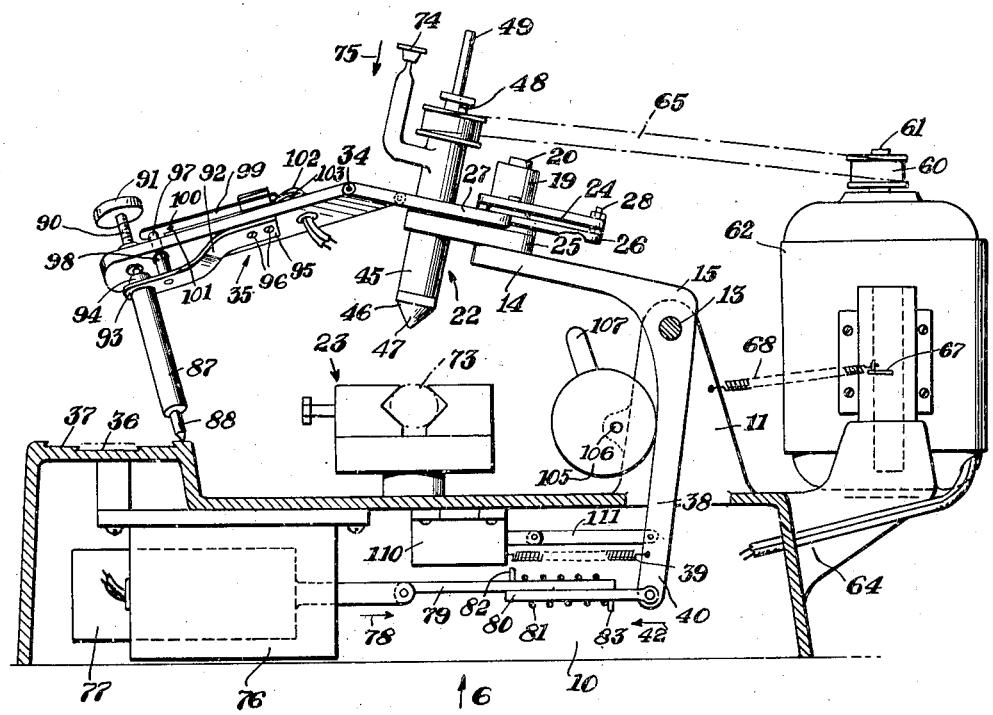
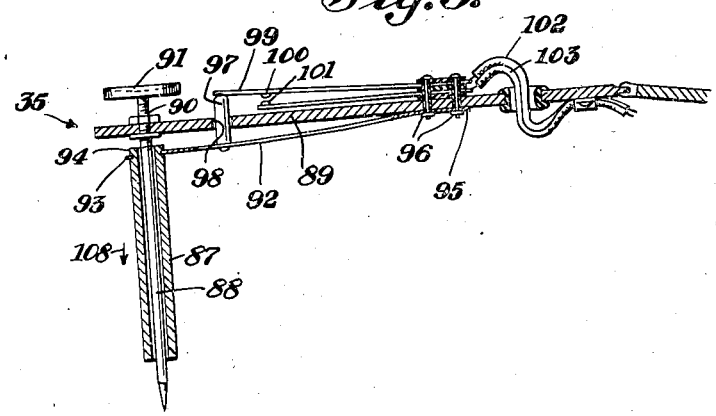
INVENTOR.
Gerhard G. Gruettner Sept. 13, 1949.  G. G. GRUETTNER  2,481,657
ELECTRICALLY OPERATED ENGRAVING AND
COPYING MACHINE
Filed Jan. 25, 1946  3 Sheets-Sheet 2

Fig. 2.

INVENTOR.
Gerhard G. Gruettner

Sept. 13, 1949.　　　　　G. G. GRUETTNER　　　　　2,481,657
ELECTRICALLY OPERATED ENGRAVING AND
COPYING MACHINE Filed Jan. 25, 1946　　　　　　　　　　　　3 Sheets-Sheet 3

INVENTOR.
Gerhard G. Gruettner
BY

Patented Sept. 13, 1949

2,481,657

UNITED STATES PATENT OFFICE 2,481,657

ELECTRICALLY OPERATED ENGRAVING AND COPYING MACHINE

Gerhard G. Gruettner, New York, N. Y., assignor to New Hermes Engraving Machine Corp., New York, N. Y.

Application January 25, 1946, Serial No. 643,317

3 Claims. (Cl. 90—13.1)

My present invention relates to engraving machines and like reproducing machines for use in connection with any suitable material to be engraved in any desired manner.

My present invention particularly relates to engraving machines of the type described in my copending U. S. patent application Serial No. 592,877, filed May 9, 1945, and entitled "Engraving or copying machines."

My present invention is also disclosed in my co-pending patent application Serial No. 643,318, filed Jan. 25, 1946, and entitled "Electromagnetic operating means for engraving and copying machines."

It is an object of my present invention to provide a machine of the aforesaid type which is simple in construction, efficient in operation and easy to handle even by an unskilled operator.

Another object of my invention consists in the provision of a portable machine of the above type which may be carried about by the operator and installed at any desired place for engraving or like purposes.

A further object of my present invention consists in a pantographic engraving device enabling reproduction of the indicia to be copied in different sizes without any complicated adjustment of the pantograph leverage mechanism.

Still another object of my invention consists in means which enable operation of an engraving machine with one hand avoiding the necessity of moving the engraving tool into contact with the work piece to be engraved.

Still a further object of my present invention consists in means enabling operation of an engraving machine of the type set forth above by simply following with a stylus the indicia to be copied.

Finally, it is also still a further object of my present invention to provide in an engraving or copying machine of the above described type means which are connected with the stylus forming part of the machine and arranged so as to automatically move the engraving tool whenever the tip of the stylus is pressed against the indicia to be copied.

With the above objects in view, my present invention mainly consists of an engraving or copying machine for reproducing indicia comprising in combination a base, a work holder secured to this base, an engraving tool mounted on this base movably in direction toward and away from the mentioned work holder, means tending to move the engraving tool in direction away from this work holder, electrical moving means adapted to move the engraving tool toward this work holder, means secured to the mentioned base for holding the indicia to be reproduced, a stylus for following these indicia, a pantograph mechanism connecting this stylus with the engraving tool mentioned above, holding means associated with the said stylus for manually holding the same and guiding it along the indicia, electrical contact means associated with these holding means and constructed so as to be automatically closed when the said holding means are guiding the stylus along the indicia, and an electrical circuit including these contact means mentioned above in such a manner that said engraving tool is automatically moved toward said work holder by said electrical moving means, whenever said electrical contact means are closed, i. e. when said holding means are guiding the stylus along the indicia to be copied.

In accordance with my present invention, I preferably use electromagnetic moving means, particularly an electromagnetic solenoid arrangement for moving the engraving tool toward the work holder.

Furthermore, I have also found it preferable to employ as holding means a holding sleeve surrounding the stylus and arranged slidably along the same between two positions, namely an operative position nearer to the indicia to be reproduced, and an inoperative position farther from the indicia.

With a holding sleeve of above type I combine spring means tending to move the sleeve into inoperative position and electrical contact means comprising two contact members one of which is secured to the sleeve or a part moving together with the same, and the other of which is secured to the stylus. These contact members have to be arranged and constructed in such a manner that they are in contact with each other when the holding sleeve is in operative position and are spaced from each other when this holding sleeve is in inoperative position.

It should also be mentioned that I have found it particularly advisable to combine the electrical operating mechanism described above with a pantographic engraving or copying machine which comprises a support attached to the base turnably about a horizontal axis, a movable pantograph mechanism pivoted to this support turnably about a pivoting axis which is normal to the plane in which this pantograph mechanism is moving, an engraving tool secured to this pantograph mechanism rotatably about an axis which is also normal to the plane in which the said pantograph mechanism is moving, and a work holder which is secured to the base in such a manner as to be located at least substantially under the mentioned engraving tool.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view of an engraving machine according to my present invention in inoperative position, seen in direction of arrow 1 on Fig. 2, with part of the side wall of the base removed;

Figure 2:
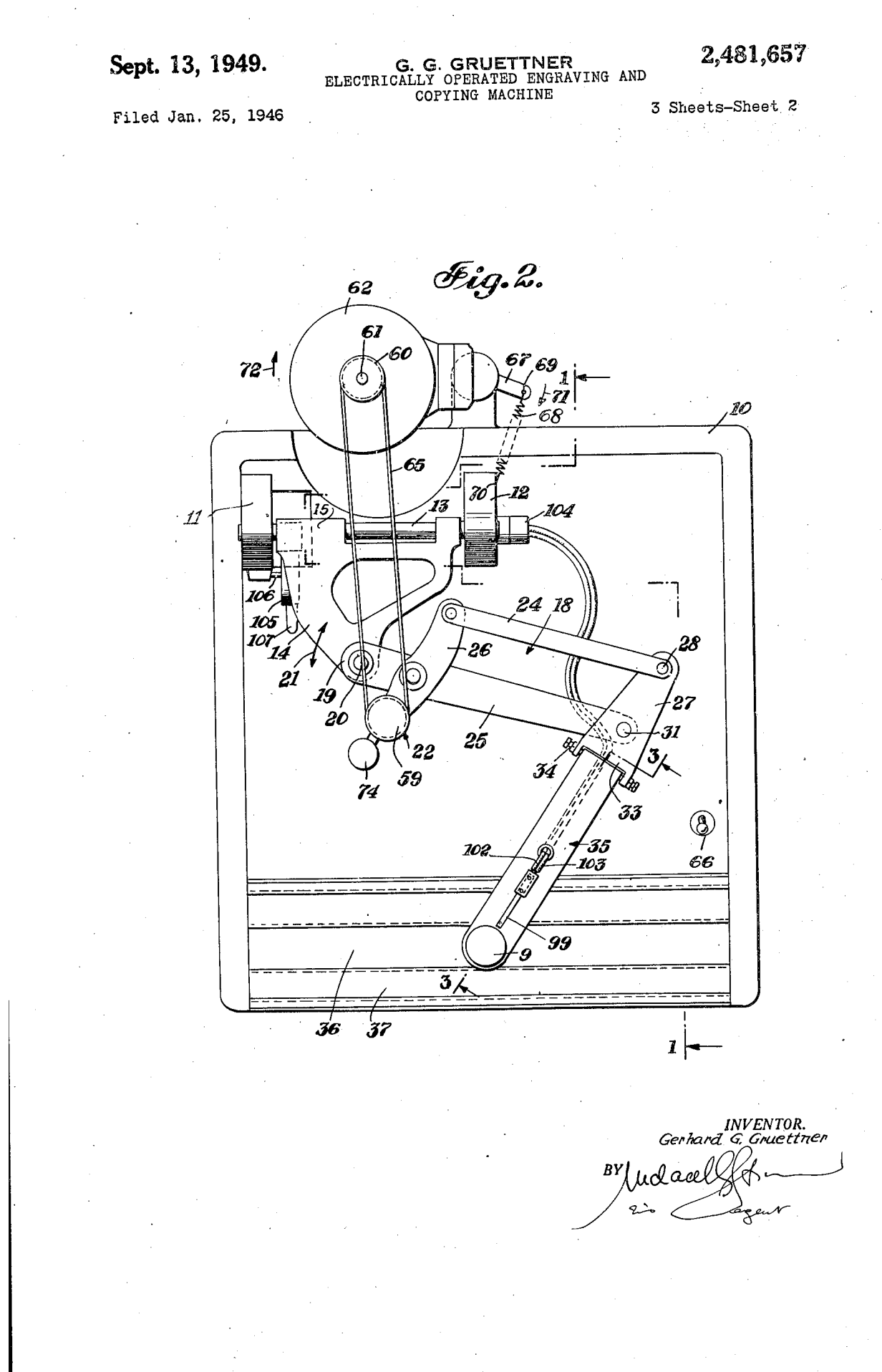

Fig. 2 is a top view of the engraving machine shown in Fig. 1, seen in direction of arrow 2 on Fig. 1;

Fig. 3 is a cross section through the stylus, the holding sleeve and electrical contact arrangement connected with the same along line 3—3 on Fig. 1;

Figure 5:
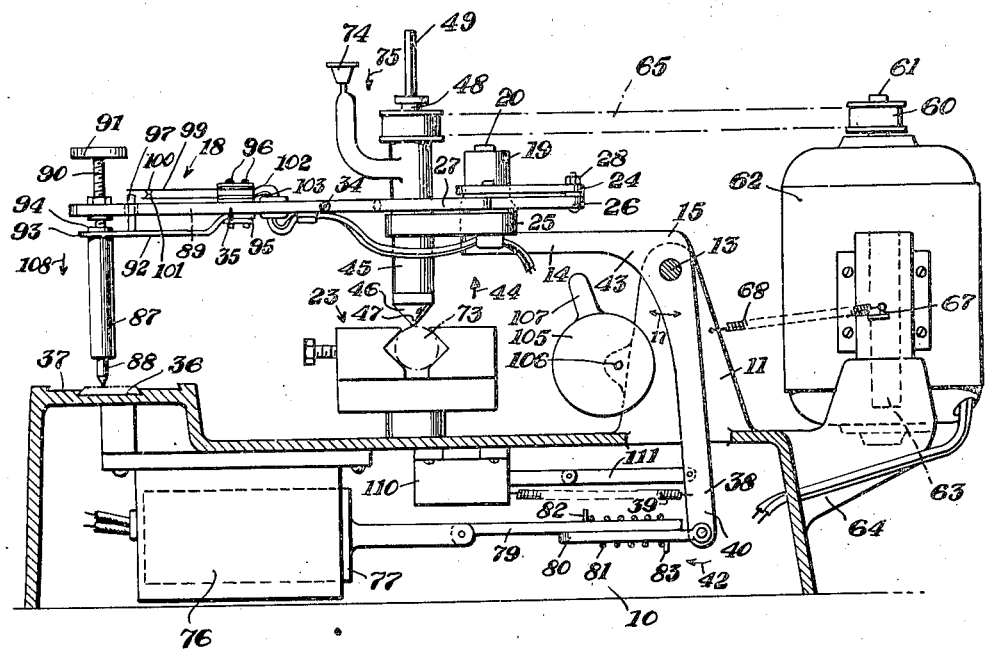
Fig. 5 is a side view of the engraving machine shown in Figs. 1 and 2 in operative position.

As shown in the drawings, my new engraving machine comprises as main elements a base 10, two supporting brackets 11 and 12 firmly mounted on this base, a turnable horizontal shaft 13 pivoted to brackets 11 and 12, a supporting member 14 secured to this horizontal shaft 13 by means of lugs 15 and 16 and turntable up and down together with this shaft about its horizontal axis in direction of arrow 17, a pantograph mechanism 18 of known type pivoted by means of pivot sleeve 19 to the substantially vertical pivot 20 secured to support 14 in such a manner that the pantograph mechanism is movable about this pivot 20 in horizontal plane as indicated by arrow 21, and an engraving tool 22 arranged also at least substantially vertically and secured to the pantograph mechanism 18 in the specific manner described below in detail.

As shown in the drawings, I arrange under the engraving tool a work holder 23 which might be of any conventional type and does not form part of my present invention; however, I wish to note that I prefer to use in combination with my new machine described hereinafter and claimed in the following claims a work holder of the type described and claimed in my co-pending U. S. patent application Serial No. 592,875, filed May 9, 1945, and entitled "Work piece holders," and now abandoned.

The pantograph mechanism of my new machine consists as usual of four pantograph members 24, 25, 26 and 27 turnably connected at 28, 29, 30 and 31 so as to form a parallelogram. The pantograph member 26 extends at 32 beyond the pantograph member 25 and serves as support for the engraving tool 22. The pantograph member 27 extends at 33 also beyond the pantograph member 25 and is turnably connected at 34 to a stylus 35 adapted to follow the outline of the indicia 36 firmly supported by an indicia holder 37 which does not form part of my present invention; however, I wish to note that I prefer to use in combination with my present invention an indicia holder of the type described and claimed in my copending patent application Serial No. 592,876, filed May 9, 1945, and entitled "Indicia holders," and now abandoned.

In order to prevent undesired contact between the engraving tool 22 and the work piece supported by work holder 23, it is necessary to move the engraving tool between engraving periods into inoperative position out of contact with the work piece. For this purpose, an arm 38 is provided on lug 15 of support 14 and a spring 39 is secured at its one end to the lower end 40 of arm 38 and at its other end to a projecting part 41 of base 10; this spring permanently tends to pull arm 38 in direction of arrow 42, thereby tending to turn the entire support 14 in direction of arrow 43 causing the engraving tool 22 to be forced in direction of arrow 44 away from the work piece supported by the work piece holder 23.

The engraving tool 22 comprises an outer supporting sleeve member 45 provided at its lower end with a conical portion 46 the tip 47 of which serves for guiding the engraving tool on the work piece to be engraved. This supporting sleeve member 45 rotatably supports a holder 48 which is of tubular shape and holds the engraving needle 49 which is used for actual engraving of the work piece.

In order to rotate the needle with the necessary speed, a pulley 59 is provided at the top of the rotatable tool holder 48 firmly secured to the same; a corresponding pulley 60 is firmly secured to shaft 61 of the electric motor 62; this motor 62 is pivoted at 63 turnably about a vertical axis to bracket 64 secured to and forming part of base 10. The driving belt 65 engaging pulleys 59 and 60 transmits the rotating movement of shaft 61 to tool holder 48 and the engraving needle held by the same. Switch 66 inserted in the electric circuit of motor 62, which circuit is not shown in the drawings, serves for starting and stopping operation of the motor.

As mentioned above, motor 62 is turnably pivoted to bracket 64; this enables the motor to follow the movement of the pantograph mechanism during the engraving operation; however, despite such following movement of the motor, it is also necessary to keep the driving belt 65 permanently under tension. This tension is obtained by means of pin 67 secured to the motor and spring 68 secured at its one end 69 to this pin 67 and at its other end 70 to bracket 12 and tending to turn pin 67 in direction of arrow 71 resulting in a tendency of motor 62 to turn in direction of arrow 72. This keeps the driving belt 65 under permanent tension.

It is, of course, possible to operate an engraving machine of the above described type in the usual way, i. e. by pressing the pantograph mechanism 18 and the support 14 by means of button 74 downward in direction of arrow 75. This manual downward-pressing movement is continued until the point of the engraving needle 49 contacts the work piece 73. It is evident that for such manual operation of the engraving machine both hands are needed, i. e. one hand for holding and moving the stylus 35 along the indicia 36 and the other hand for carrying out the above mentioned downward-pressing movement of the engraving needle 49. Of course, such operation of the machine is not only rather difficult and cumbersome, but also necessitates accurate synchronization between the two movements, i. e. between the following movement carried out by stylus 35 and the pressing down movement of the engraving needle 49.

In order to avoid such complicated operation of the engraving machine, I provide in accordance with my present invention electrical means for automatically moving the engraving needle 49 into operative position whenever the stylus 35 is in operative position pressed with its tip against the indicia 36.

This electrical arrangement according to my present invention comprises as main elements a solenoid 76 of well-known type built in such a manner as to pull the core 77 in direction of arrow 78 whenever it is energized, and the connecting rods 79 and 80 connecting, as shown in Figs. 1 and 5, the core 77 with the arm 38 secured to the tiltable support 14.

I have found that in case such an electromagnetic arrangement, particularly if a solenoid arrangement, is used and the same is connected with an alternating source of current, it is of great importance that the core 77 be drawn entirely into the solenoid 76 when the same is energized. If this is not the case, a relatively great current is necessary to obtain the necessary force.

However, as well-known, the work pieces 73 to be engraved are of different size and therefore the operative position of arm 38 depends on the size of the work pieces. Accordingly, if instead of the two rods 79 and 80 only one connecting rod would be used, the final operative position of core 77 would be different for different work pieces, i. e. it would project to different degrees beyond the open end of solenoid 76 and would not be drawn entirely within the same.

In order to avoid such different positions of the core 77 in operative position and to enable the core to be drawn entirely within solenoid 76 when the same is energized independently from the final operative position of arm 38, I provide a slidable spring connection between the rod 79 and the rod 80.

This spring connection consists, as clearly shown in the drawings, particularly Figs. 1 and 5, of a spring 81 held by pin 82 secured to rod 79 and pin 83 secured to rod 80 in the position shown in the drawings. This spring 81 tends to move pins 82 and 83 away from each other and is thus adapted to transmit motion impulses from rod 79 to rod 80. It is evident that by use of a spring arrangement of this type it is possible to transmit motion impulses from solenoid 76 to arm 38 in such a manner that the core 77 is in operative position always drawn entirely within solenoid 76. Of course, depending upon the operative position of arm 38, the distance between pins 82 and 83 will vary.

As clearly shown in Fig. 4, the electrical circuit 84 comprises not only the solenoid 76, but also the general switch 66 connecting this circuit 84 with the source of electric current 85, and the contact arrangement 86 described below in detail.

The contact arrangement 86 serves for energizing solenoid 76 and comprises as main elements the slidable holding sleeve 87 surrounding the follower needle 88 forming part of stylus 35. This follower needle 88 is firmly secured to the stylus arm 89 forming also part of stylus 35; this stylus arm is pivoted as described above by pivoting means 36 to the pantograph mechanism 18.

The follower needle 88 is provided as usual with a screw threading 90 and knob 91 for adjusting the length of this needle. For the sake of the record, it should be noted that knob 91 never serves for holding the stylus 35 during operation, but serves always exclusively only for adjusting the length of needle 88. The stylus 35 is guided during engraving always by gripping the follower needle 88 below arm 89.

The slidable holding sleeve 87 is not secured to the follower needle 88 but freely slidable along the same. It is attached to the stylus arm 89 by means of spring 92 which is firmly secured at its one end 93 to the top 94 of sleeve 87 and at its other end 95 by the small screws 96 to arm 89. This spring attachment enables sliding movement of the sleeve 87 along the follower needle 88.

In the embodiment shown, a pin 97 is secured to spring 92. This pin passes through hole 98 in arm 89 and is at its other end connected to the contact spring 99 carrying the contact member 100. Another contact member 101 is secured directly to arm 89 under contact member 100, as shown. Both these contact members 100 and 101 are connected by means of electric wires 102 and 103, respectively, with the electric circuit 84 shown in Fig. 4.

Figure 4:
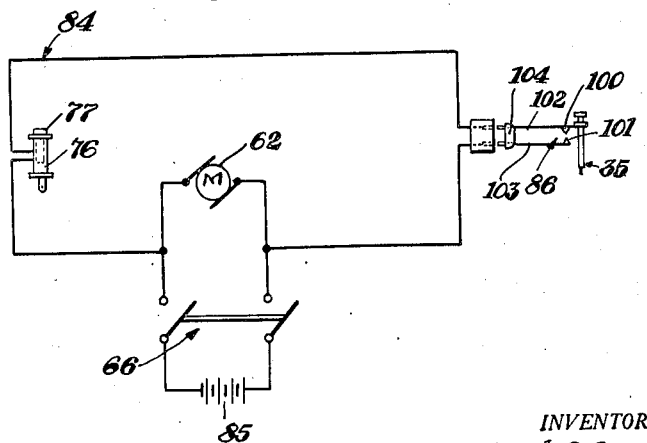
Fig. 4 is the electrical circuit including the electrical contact arrangement shown in Fig. 3 and the electromagnetic operating means shown in Fig. 1.

Since closing of switch 66 not only connects the solenoid arrangement described above with the source of electric current 85 but also causes rotation of motor 62, I provide a plug 104 arranged as shown in Figs. 1, 4 and 5. Of course, I might use instead of this plug 104 connecting the contact means with the circuit 84 also a second switch similar to switch 66.

My above described engraving machine operates as follows:

First the indicia 36 are placed upon and secured to the indicia holder 37 and work piece 73 indicated in the drawing in dotted lines is firmly secured to the work holder 23. Of course, it is necessary to adjust the work holder in such a manner that when stylus 35 is in contact with the indicia 36 to be copied, the work holder 23 and the work piece 73 held by the same are in proper position for engraving under the engraving needle 49. I have found it advisable in order to avoid too great a distance between the engraving needle 49 in inoperative position, as shown in Fig. 1, and the operative position, as shown in Fig. 5, to provide means for adjusting the inoperative position of the engraving needle 49 and of the support 14 holding the same. These adjusting means consist, as shown in the drawings, of an eccentric cam 105 turnably pivoted at 106 to the bracket 11. An adjusting lever 107 enables turning of the cam 105 about its pivoting point 106. This cam 105 is arranged so that in its initial inoperative position arm 38 abuts against it as shown in Fig. 1. Thus, it is evident that by adjusting the position of cam 105 by means of the adjusting lever 107, the initial inoperative position of arm 38 and support 14 secured thereto can be adjusted.

After these preliminary steps the switch 66 is closed, starting rotation of motor 62 which, in turn, rotates the engraving needle 49.

In order to start engraving, the holding sleeve 87 surrounding the follower needle 88 of stylus 35 is gripped by the operator and guided in such a manner as to press the tip of the follower needle 88 against the indicia 36 to be copied. It is evident that during pressing of the needle 88 against the indicia by means of the slidable holding member 87, this holding member will be moved downward along needle 88 in direction of arrow 108 from its inoperative position shown in Fig. 1 into its operative position shown in Fig. 5. Such downward movement of the holding sleeve 87 will result in contact of the contact members 100 and 101 and in closing of the circuit 84. This in turn will result in energization of solenoid 76 and movement of the solenoid core 77 in direction of arrow 78 from its inoperative position shown in Fig. 1 into its operative position shown in Fig. 5. Such movement of the solenoid core will have a pushing effect upon arm 38 forcing the same together with support 14 and engraving needle 49 into the operative position shown in Fig. 5.

It should be stressed that this effect is obtained without exerting any pressure by hand against the top of the engraving needle 49, i. e. fully automatically, simply by holding the follower needle 88 by means of sleeve 87 and pressing it against the indicia to be copied.

It is evident that whenever the follower needle 88 is lifted by means of sleeve 87 from the indicia 36, the contact members 100 and 101 become disengaged and the solenoid 76 is deenergized thereby enabling spring 39 to move arm 38 together with support 14 and the engraving needle 49 from its operative position shown in Fig. 5 back into inoperative position shown in Fig. 1.

It will be understood that each of the elements described above, or two or more together, may also find a useful application in other types of engraving and copying machines differing from the types described above.

While I have illustrated and described the invention as embodied in engraving and copying machines provided with turnably supported pantograph mechanisms, I do not intend to be limited to the details shown, since various modifications and structural changes may be made without departing in any way from the spirit of my invention.

Thus, for instance, I might combine with an engraving machine of the type proposed by me a pneumatic braking device 110 secured to base 10 and connected by plunger rod 111 with arm 38 in such a manner as to brake the speed of turning of this arm from its inoperative into its operative position, while exerting no braking effect during movement of this arm back from its operative into its inoperative position. Such braking means prevent the engraving needle 49 from hitting the work piece 73 with too great a force thus avoiding damage to the needle or to the work piece to be engraved.

Without further analysis, the foregoing will so fully reveal the gist of my invention that others can, by applying current knowledge, readily adapt it for various applications without omitting features that, from the standpoint of prior art, fairly constitute essential characteristics of the generic or specific aspects of this invention and therefore such adaptations should and are intended to be comprehended within the meaning and range of equivalence of the following claims.

What I claim as new and desire to secure by Letters Patent is:

1. In an engraving or copying machine for reproducing indicia, a base; a work holder secured to said base; a tool support mounted on said base movably in direction toward and away from said work holder; a pantograph mechanism carried by said tool support; an engraving tool turnably carried by said pantograph mechanism; indicia holding means secured to said base for holding the indicia to be reproduced; a stylus movably mounted on and carried by said pantograph mechanism for following the indicia held by said indicia holding means; means mounted on said base tending to move said tool support together with said pantograph mechanism and said engraving tool away from said work holder; electrical moving means mounted on said base for moving said tool support together with said pantograph mechanism and said engraving tool toward said work holder; electric switch means including two electrical contact members both of which are mounted on and carried by said stylus; switch operating means movably mounted on and carried by said stylus for moving said electrical contact members into and out of engagement with each other; and an electrical circuit including said electrical contact members and said electrical moving means in such a manner that said electrical moving means move said tool holder together with said pantograph mechanism and said engraving tool toward said work holder when said electrical contact members mounted on and carried by said stylus are moved into engagement by said switch operating means also mounted on and carried by said stylus during operation of the same.

2. In an engraving or copying machine for reproducing indicia, a base; a work holder secured to said base; a tool support mounted on said base movably in direction toward and away from said work holder; a pantograph mechanism carried by said tool support; an engraving tool turnably carried by said pantograph mechanism; indicia holding means secured to said base for holding the indicia to be reproduced; a stylus movably mounted on and carried by said pantograph mechanism for following the indicia held by said indicia holding means; means mounted on said base tending to move said tool support together with said pantograph mechanism and said engraving tool away from said work holder; electrical moving means mounted on said base for moving said tool support together with said pantograph mechanism and said engraving tool toward said work holder; electric switch means including two electrical contact members both of which are mounted on and carried by said stylus; a stylus holding member mounted on and carried by said stylus slidably in axial direction of the same; spring means permanently tending to slide said stylus holding member in direction away from the tip of said stylus; switch operating means mounted on and carried by said stylus holding member for moving said electrical contact members into engagement with each other when said stylus holding member is slid in direction of the axis of said stylus toward the tip of the same; and an electrical circuit including said electrical contact members and said electrical moving means in such a manner that said electrical moving means move said tool holder together with said pantograph mechanism and said engraving tool toward said work holder when said electrical contact members mounted on and carried by said stylus are moved into engagement by said switch operating means also mounted on and carried by said stylus during operation of the same.

3. In an engraving or copying machine for reproducing indicia, a base; a work holder secured to said base; a tool support mounted on said base movably in direction toward and away from said work holder; a pantograph mechanism carried by said tool support; an engraving tool turnably carried by said pantograph mechanism; indicia holding means secured to said base for holding the indicia to be reproduced; means mounted on said base tending to move said tool support together with said pantograph mechanism and said engraving tool away from said work holder; electrical moving means mounted on said base for moving the tool support together with said pantograph mechanism and said engraving tool toward said work holder; a stylus arrangement mounted on and carried by said pantograph mechanism for following the indicia held by said indicia holding means and including a stylus movably secured to said pantograph mechanism, a stylus holding member mounted on and carried by said stylus slidably in axial direction of the same, and spring means mounted also on said stylus permanently tending to slide said stylus holding member in direction away from the tip of said stylus; electrical switch means entirely mounted on and carried by said stylus arrangement so as to be operated during sliding of said stylus holding member in axial direction of said stylus; and an electrical circuit including said electrical switch means mounted on and carried by said stylus arrangement and said electrical moving means mounted on said base in such a manner that said electrical moving means move said tool holder together with said pantograph mechanism and said engraving tool toward said work holder when said electric switch means entirely mounted on and carried by said stylus arrangement are operated by sliding of said stylus holding member in axial direction of said stylus relative to the same.

GERHARD G. GRUETTNER.

REFERENCES CITED

The following references are of record in the file of this patent:

UNITED STATES PATENTS

| Number | Name | Date |
| --- | --- | --- |
| 656,940 | Chevalier | Aug. 28, 1900 |
| 938,936 | Ziegler | Nov. 2, 1909 |
| 2,199,261 | Kapp | Apr. 30, 1940 |

FOREIGN PATENTS

| Number | Country | Date |
| --- | --- | --- |
| 281,777 | Great Britain | Dec. 12, 1927 |